United States Patent
Kobayashi et al.

[11] Patent Number: 5,946,510
[45] Date of Patent: *Aug. 31, 1999

[54] ALBADA TYPE FINDER AND CAMERA THEREFOR HAVING A MOVABLE MASK

[75] Inventors: Hideo Kobayashi; Katsuhiro Ohtake, both of Omiya, Japan

[73] Assignee: Fuji Photo Optical Co., Ltd., Saitama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/880,323

[22] Filed: Jun. 23, 1997

Related U.S. Application Data

[63] Continuation of application No. 08/478,928, Jun. 7, 1995, abandoned, which is a continuation of application No. 08/237,926, May 4, 1994, abandoned.

[30] Foreign Application Priority Data

May 17, 1993 [JP] Japan ................................ 5-114682

[51] Int. Cl.⁶ ............................ G03B 13/08; G03B 13/12
[52] U.S. Cl. ......................... 396/380; 396/385; 396/436
[58] Field of Search .................................. 396/373, 377, 396/378, 380, 383, 385, 386, 435, 436

[56] References Cited

U.S. PATENT DOCUMENTS

| | | | |
|---|---|---|---|
| 4,697,901 | 10/1987 | Wakabayashi et al. | 354/221 |
| 5,066,971 | 11/1991 | Kodaira | 354/222 X |
| 5,257,055 | 10/1993 | Cho et al. | 354/222 |
| 5,345,285 | 9/1994 | Hasushita et al. | 354/159 |
| 5,410,381 | 4/1995 | Kameyama et al. | 354/282 |

FOREIGN PATENT DOCUMENTS

| | | |
|---|---|---|
| 62-6725 | 1/1987 | Japan . |
| 5-107596 | 4/1993 | Japan . |
| 6-242 494 | 9/1994 | Japan . |

*Primary Examiner*—Safet Metjahic
*Assistant Examiner*—J. K. Hon
*Attorney, Agent, or Firm*—Oliff & Berridge, PLC

[57] ABSTRACT

In an Albada type finder 10 applied to a camera capable of photographing either the full size or the panoramic size, when the panoramic size is specified with a change-over switch 24, a lever 58 rotates clockwise around a pin 70, and then a lever 60 is pushed by the opening 74 and moves downward. And, rod 84 pushes a lever 62, whereby the rod 84 rotates counterclockwise around pin 86, therefore, axis 40 rotates clockwise against the biasing force of a spring 41 and axis 42 rotates counterclockwise against the biasing force of the biasing spring 43. With this arrangement, a pair of mask plates 16 and 18 enter the optical path between a half mirror 32 and an eye piece 24 in the vicinity of the half mirror 32 in the Albada type finder 10. Therefore, a light reflected outside of a panoramic size field frame of the eye piece 34 is absorbed by the mask plates 16 and 18, so that the outside of the field frame of the panoramic size can be blackened during the panoramic size shot.

11 Claims, 6 Drawing Sheets

PRIOR ART

PRIOR ART

PRIOR ART

ALBADA TYPE FINDER AND CAMERA THEREFOR HAVING A MOVABLE MASK

This is a Continuation of application Ser. No. 08/478,928 filed Jun. 7, 1995 now abandoned, which in turn is a Continuation of application Ser. No. 08/237,926, filed May 4, 1994, now abandoned.

BACKGROUND OF THE INVENTION

1. Field of the Invention

The present invention relates to an Albada type finder, more particularly it relates to an Albada type finder which is applied to a camera capable of photographing a full size and a panoramic size.

2. Description of the Related Art

A panoramic size field frame and a full size field frame are provided through the eye piece of an Albada type finder, so that an area determined with the panoramic size field frame can be regarded as a photographing area when the photographing size is changed to the panoramic mode.

However, according to the above-mentioned Albada type finder, the composition is determined by using the full size field frame in spite of the fact that the panoramic size shot will be taken, and as a result the photographing area of the panoramic size is unclear.

Therefore, in the conventional Albada type finder (as shown in FIG. 5), when the photographing size is changed to the panoramic mode, a mask member 1 is rotated around a fulcrum 2 in a manner so as to enter the optical path between a front lens 3 and an object lens 4, and, as shown in FIG. 6, a window 1A opened at the mask member 1 is positioned at a panoramic field frame 5A of the object lens 5 such that the outside of the panoramic field frame 5A is covered. Designated at reference numeral 5B is a full size field frame.

Moreover, an Albada type finder, shown in FIG. 7, is also proposed. In this Albada type finder, a mask member 1 is provided in a manner to be movable in the perpendicular direction of the optical axis 6 of the Albada type finder. The mask member 1 enters the optical path between the object lens 4 and the half mirror 7 of the Albada type finder during the panoramic size shot.

However, in the conventional Albada type finders, shown in FIGS. 5 and 7, when the outside of the panoramic field frame 5A in the eye piece 5 is exposed to an incident light 8 which passes through the window 1A at the mask member 1, the reflected light is reflected at the edge of the half mirror 7 and enters the eye of the users, therefore, there is a disadvantage in that the visibility is decreased since the mask member 1 does not blacken and a light yellow flare occurs. And, there is another disadvantage in that the full size field frame is observed during the panorama size shot since the mask member 1 does not become black.

SUMMARY OF THE INVENTION

The present invention has been developed to eliminate the above-described disadvantage and has as its aim the provision of an Albada type finder capable of blocking the outside of the second size field frame.

To achieve the above-described objective, an Albada type finder has an eye piece which is adapted for a camera capable of photographing two sizes; a first size and a second size and formed with field frames for the first size and the second size. The Albada type finder comprises a linearly movable mask member which is provided in the vicinity of a half mirror in an optical path formed between said half mirror and said eye piece of said Albada type finder and having an opening corresponding to said field frame for the second size; and a change-over mechanism for advancing said mask member into the optical path formed between said half mirror and said eye piece during the second size shot.

According to this invention, when the photographing mode is changed to the second size with the change-over mechanism, the mask member becomes close to the half mirror in the optical path which is formed between said half mirror and said eye piece of said Albada type finder. Therefore, the reflected light which is reflected to the outside of the second size field frame of the eye piece is absorbed by the mask member, that is, it is not reflected by the half mirror, therefore, the outside of the second size field frame can be blackened during the second size shot.

BRIEF DESCRIPTION OF THE DRAWINGS

The exact nature of this invention, as well as other aims and advantages thereof, will be readily apparent from consideration of the following specification relating to the accompanied drawings, in which like reference characters designate the same or similar parts throughout the figures thereof and wherein.

DESCRIPTION OF THE PREFERRED EMBODIMENT

A detailed description will hereafter be given of the preferred embodiment of the Albada type finder according to the present invention with reference to the accompanying drawings.

Figure 1:
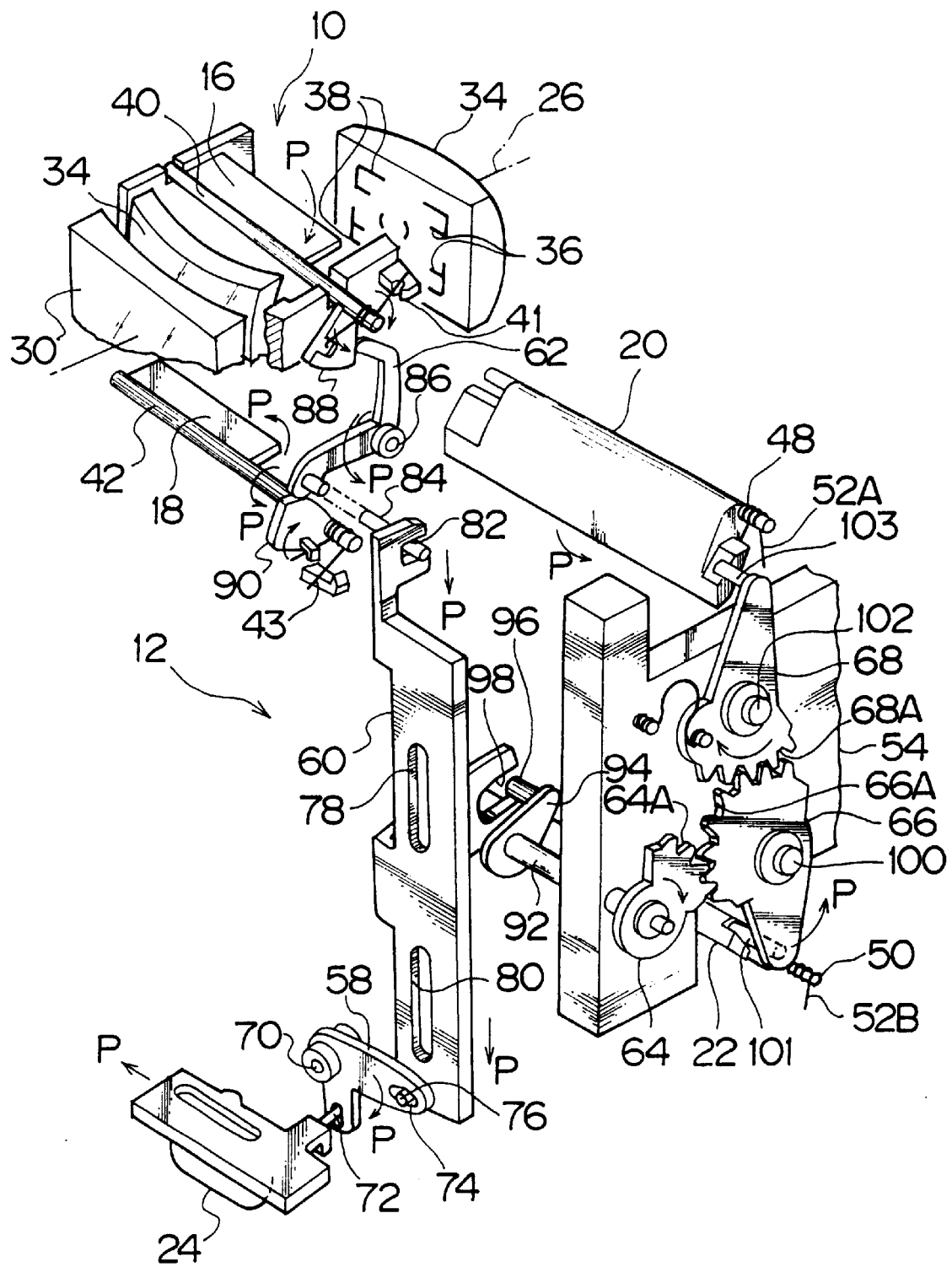
FIG. 1 is a perspective view showing one embodiment of a panoramic change-over mechanism applied to an Albada type finder according to the present invention.
Figure 2:
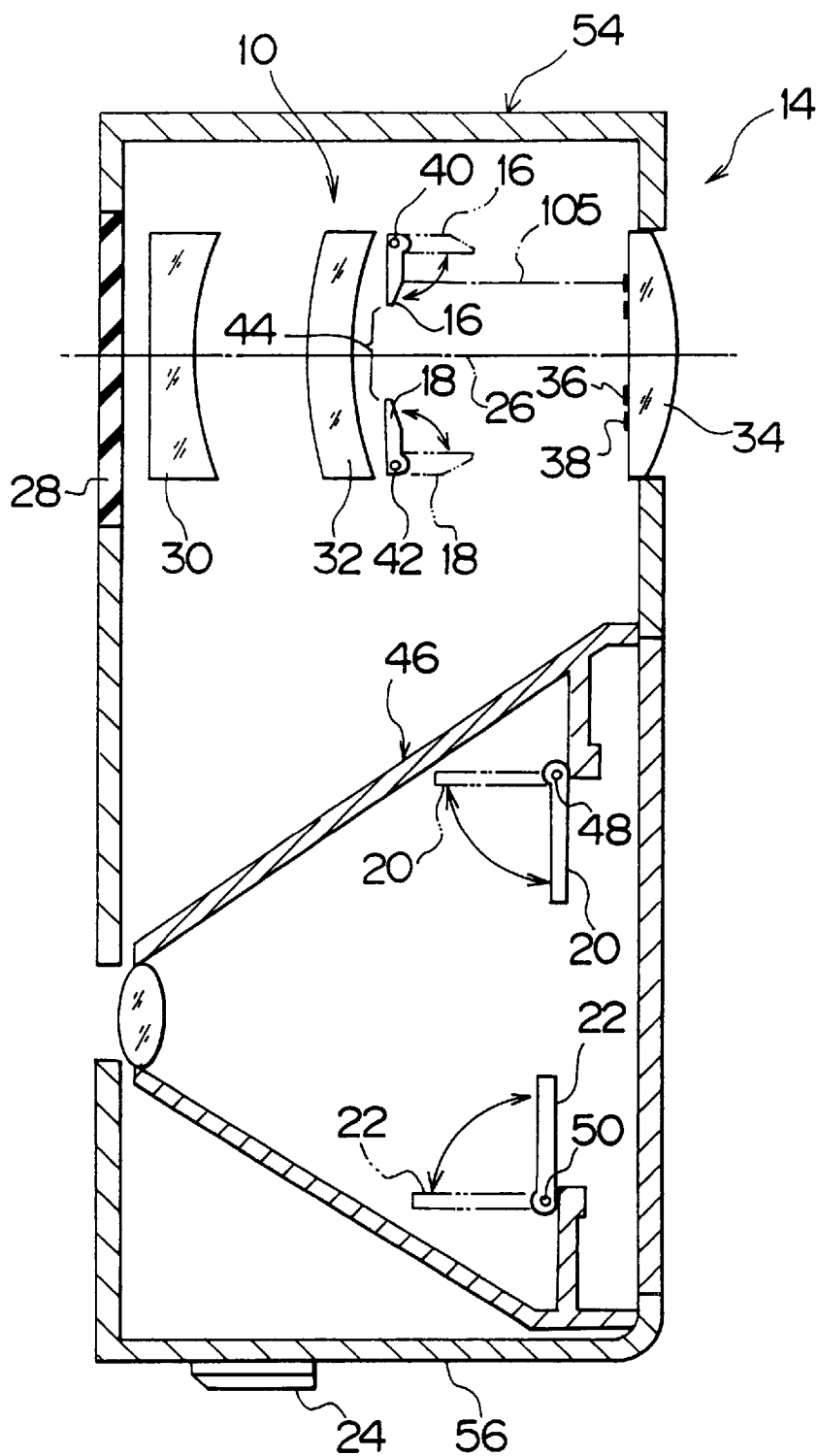
FIG. 2 is a sectional side view showing a camera provided with the Albada type finder according to the present invention.

FIG. 1 is a perspective view showing an embodiment of a panoramic-full size change-over mechanism (hereinafter, called a P-F change-over mechanism) 12 to an Albada type finder 10 according to the present invention, and FIG. 2 is a sectional side view of a camera 14 provided with the Albada type finder 10.

As shown in FIGS. 1 and 2, the camera 14 has the Albada type finder 10, a pair of mask plates 16 and 18, a pair of shielding plates 20, 22 and a panoramic-full size change-over switch 24.

Figure 3:
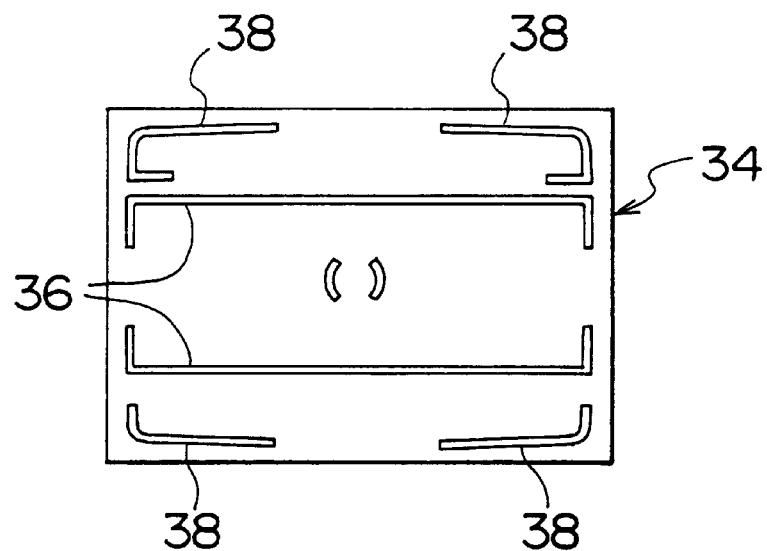
FIG. 3 is an explanatory view showing a panoramic-size field frame and a full-size field frame provided with the eye piece of the Albada type finder according to the present invention.

A front lens 28, an object lens 30, a half mirror 32 and an eye piece 34 are placed sequentially on a finder optical axis 26 and the Albada type finder 10 is composed of them. A panoramic-size field frame 36 and a full-size field frame 38 are provided on the eye piece 34, as shown in FIG. 3.

As shown in FIGS. 1 and 2, the pair of the mask plates 16 and 18 are fixed to axes 40 and 42 which are provided rotatably at the upper and lower sides of the optical path between the half mirror 32 and the eye piece 34 in the vicinity of the half mirror 32 in the Albada type finder 10. The mask plate 16, as shown in FIG. 1, is pushed in the counterclockwise direction of the FIG. 2 with the biasing force of a spring 41 attached to the axis 40. And, the mask plate 18 is pushed in the clockwise direction of the FIG. 2 with the biasing force of a spring 43 attached to the axis 42 shown in FIG. 1. The mask plates 16 and 18 are movable between the position indicated with the two-dot line and the position indicated with the solid line (on the optical path of the Albada type finder 10) FIG. 2, and a slit 44 between the mask plates 16 and 18 corresponds to the panoramic size field frame 36.

As shown in FIG. 2, the shielding plates 20 and 22 are provided in parallel and are rotatable around pins 48 and 50 at the upper and lower sides of a shielding tube 46. As shown in FIG. 1, the shielding plate 20 is pushed in the clockwise direction around the pin 48 by the biasing force of a spring 52A attached to the pin 48. And, the shielding plate 22 is pushed in the clockwise direction around the pin 50 by the biasing force of a spring 52B attached to the pin 50.

The change-over switch 24 is, as shown in FIG. 2, provided so as to be slidable at a bottom 56 of a camera body 54, and can change over between the panoramic size shot (P) and the full size shot (F).

The P-F change-over mechanism 12, as shown in FIG. 2, is made up of three levers 58, 60 and 62, three gear members 64, 66 and 68 formed in sectors and the like.

The lever 58 is formed in a L-shape and is provided rotatably around a pin 70 which is implanted in the camera body 54, and the lower end thereof is engaged with the change-over switch 24 through a pin 72. Further, an opening 74 is formed at the right end of the lever 58 and is engaged with a pin 76 fixed to the lower end of the lever 60.

The lever 60 is placed in the vertical direction of the camera 14, and pins (not shown) are engaged in a pair of slots 78 and 80 which are formed in the longitudinal direction. With this arrangement, the lever 60 is movable both up and down along the slots 78 and 80. A slot 82 is formed at the upper end of the lever 60 and the top of a rod 84 is fixed to the lever 62, which is engaged in the slot 82.

The lever 62 is formed in a likeness L-shape and provided rotatably around a pin 86 implanted in the camera body 54. Further, the upper end of the lever 62 is pushed against a piece 88 which is fixed to the axis 40 by the biasing force of the spring 41 and the lower end of the lever 62 is pushed against a cam 90 by the biasing force of the spring 43 which is fixed to the axis 42.

On the other hand, the gear member 64 is fixed at the top of the axis 92. A lever 94 is fixed at the base of the axis 92 and engaged with a ditch 98 projected on the lever 60 through a pin 96.

A gear 64A which is formed at the gear member 64 is engaged with a gear 66A which is formed at the gear member 66. The gear member 66 is provided rotatably around a pin 100 which is implanted in the camera body, and a pin 101 which is fixed on the top portion of the gear member 66 is pushed against the side of the shielding plate 22. When the gear member 66 is rotated around the pin 100 counterclockwise, the shielding plate 22 is rotated clockwise by the basing force of the spring 52B, so that it can move to the position indicated by the solid line in FIG. 2.

The gear 66A which is formed at the gear member 66 is engaged with a gear 68A which is formed at the gear member 68. The gear member 68 is provided rotatably around a pin 102 implanted in the camera body, and a pin 103 which is fixed on the top portion of the gear member 68 is pushed against the side of the shielding plate 20. When the gear member 68 is rotated around the pin 102 clockwise, the shielding plate 20 is rotated counterclockwise by the biasing force of the spring 52A, so that it can move to the position indicated by the two-dot line in FIG. 2.

Next, a detailed description will be given of the action of the P-F change-over mechanism 12 in the Albada type finder 10 with the above-mentioned construction.

First, when the change-over switch 24, which is set for the full size shot, is moved to the left in FIG. 1 for the panoramic size shot, the lever 58 is rotated clockwise around the pin 70; interlocking with this change-over action is the lever 60 which is pushed by the opening 74, also then is moved down. And, the lever 62 is pushed with the rod 84 and rotated counterclockwise around the pin 86, therefore, the axis 40 is rotated clockwise against the biasing force of the spring 41 and the axis 42 is rotated counterclockwise against the biasing force of the spring 43. With this arrangement, both of the mask plates 16 and 18 enter the optical path between the half mirror 32 and the eye piece 34 in the Albada type finder 10, as shown in FIG. 2.

The slot 98 of the lever 60 pushes the pin 96; interlocking with the downward action of the lever 60, the gear member 64 is rotated clockwise around the axis 92. With this action, the gear member 66 rotates counterclockwise and the gear member 68 rotates clockwise. The shielding plates 18 and 20 rotate from the position indicated by the two-dot line to the position indicated by the solid line in FIG. 2, interlocking with the rotation of the gear members 66 and 68, and then are held in position. Therefore, the aspect ratio of the picture size is changed over from the full-size to the panoramic-size.

In this embodiment, both of the mask plates 16 and 18 enter the optical path between the half mirror 32 and the eye piece 34, so that the reflected light 105, which reflects to the outside of the panoramic-size field frame 36 on the eye piece 34, can be taken with the mask plates 16 and 18.

Figure 4:
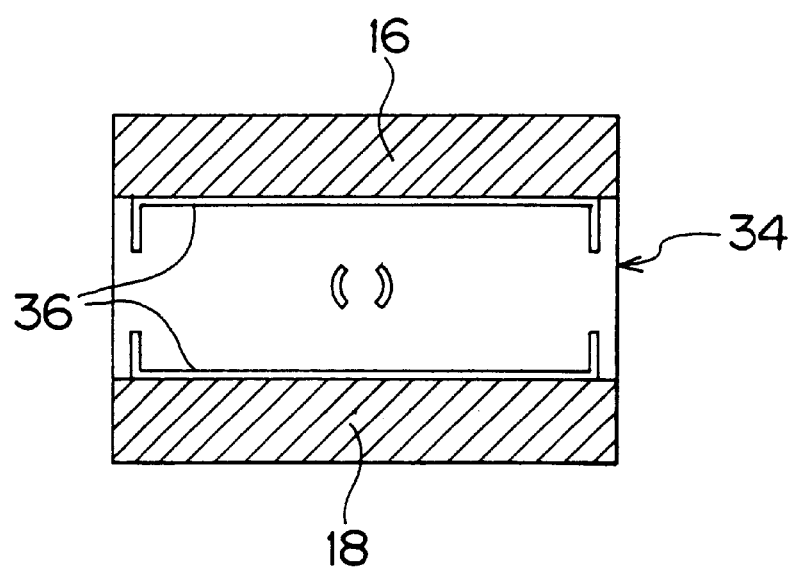
FIG. 4 is an explanatory view showing the field frame during the panoramic shot of the Albada type finder according to the present invention.
Figure 5:
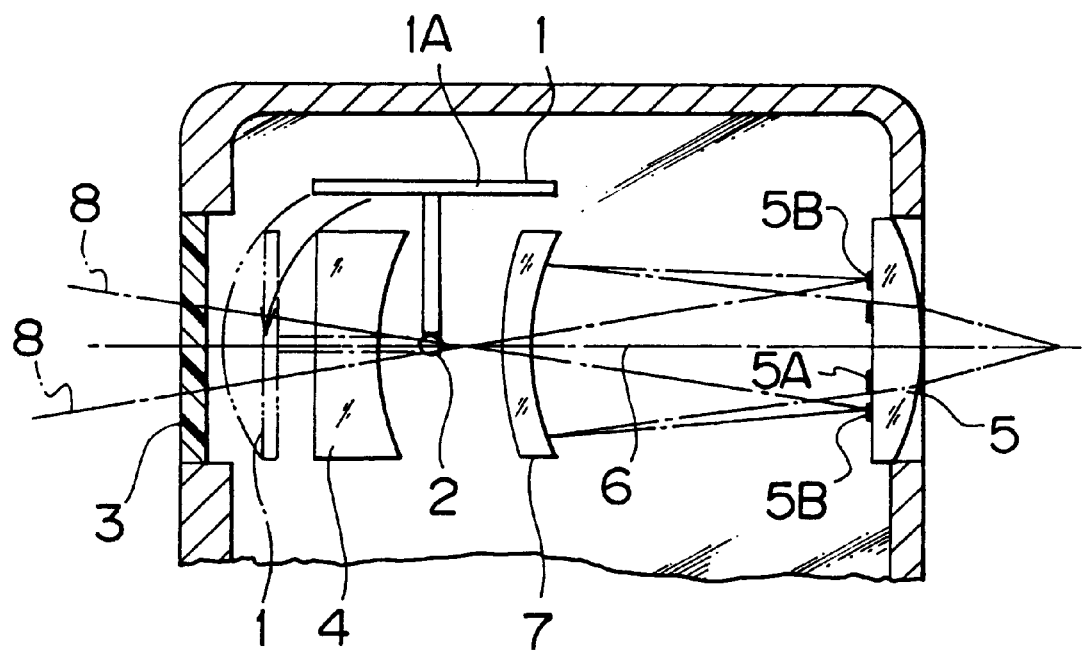
FIG. 5 is a side view showing the first embodiment of the conventional Albada type finder.
Figure 6:
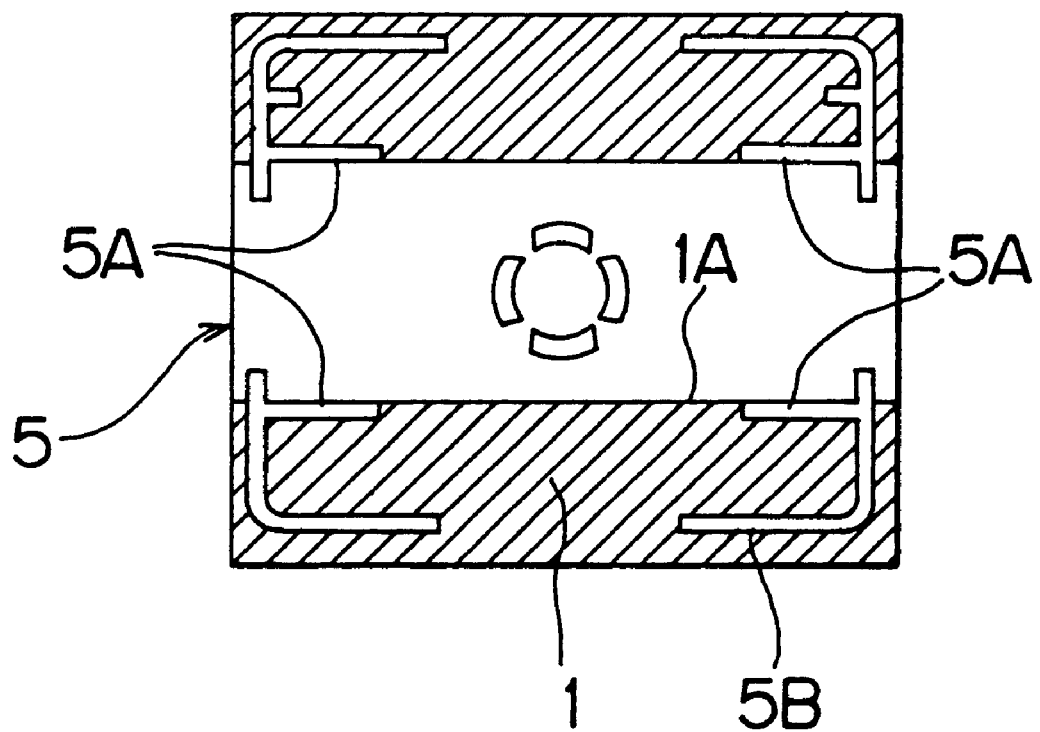
FIG. 6 is an explanatory view showing the field frame during the panoramic size shot with the conventional Albada type finder.
Figure 7:
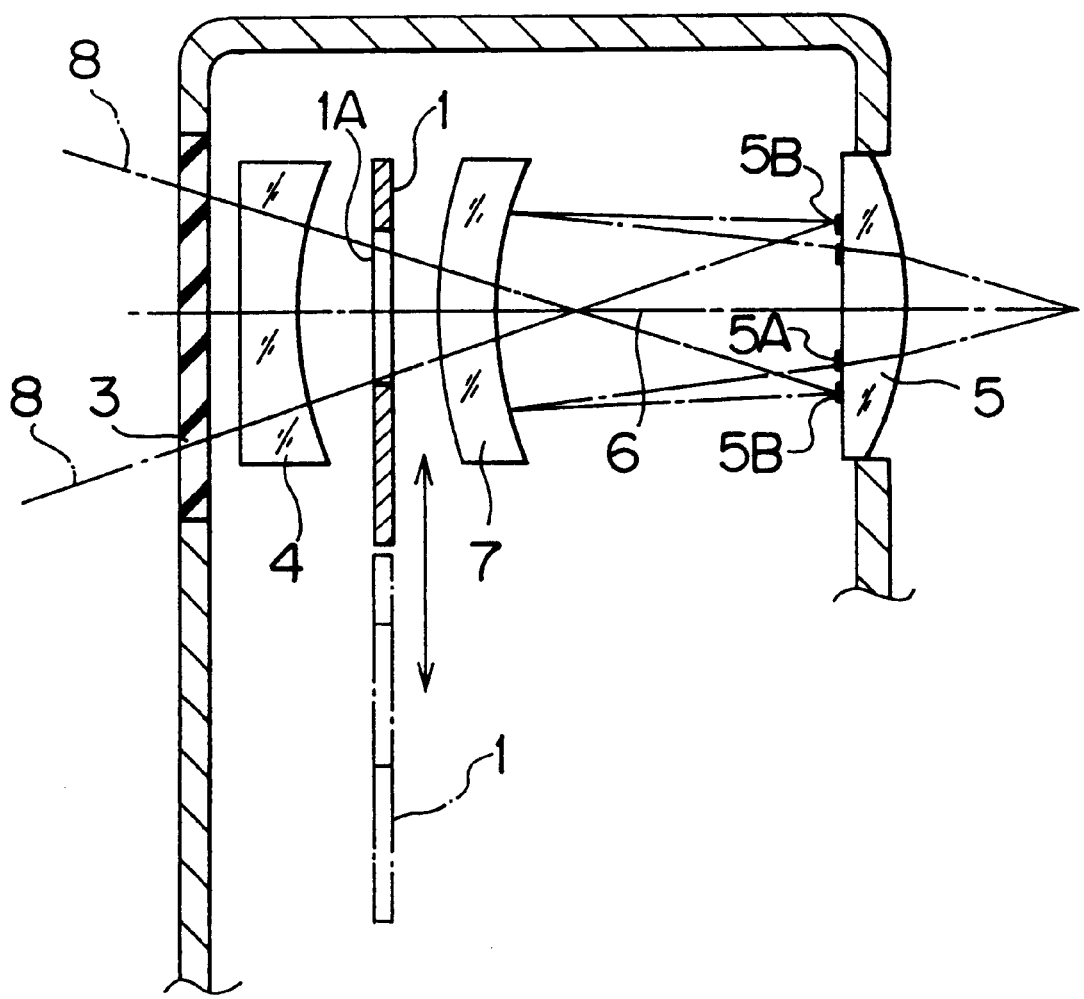
FIG. 7 is a side view showing the second embodiment of the conventional Albada type finder.

Therefore, the reflected light 105 is not reflected by the half mirror 32, so that the outside of the panoramic-size field frame 36 which is observed from the eye piece 34 can be black. With this arrangement, as shown in FIG. 4, the full-size field frame 38 is not observed during the panoramic-size shot.

Next, when the change-over switch 24, which is set for the panoramic size shot, is moved to the right in FIG. 1 for the full size shot, the lever 58 is rotated to the former position shown in FIG. 1; interlocking with this change-over action the lever 60 is pushed by the pin 76 and moved up to the former position and the lever 62 returns to the former position. Therefore, the mask plates 16 and 18 retract from the optical path between the half mirror 32 and the eye piece 34, as indicated by the two-dot line in FIG. 2.

The gear member 64 is rotated counterclockwise around the axis 92; interlocking with the upward action of the lever 60, the gear member 66 rotates clockwise and the gear member 68 rotates counterclockwise. The shielding plates 18 and 20 rotate from the position indicated by the solid line to the position indicated by the two-dot line in FIG. 2, interlocking with the rotation of the gear members 66 and 68, and then are held in position. Therefore, the aspect ratio of the picture size is changed over from the panoramic to the full size.

In this embodiment, the first size is referred to as the full size and the second size is referred to as the panoramic size. However, the second size may be referred to as a half size, cinema size or a high vision size.

As described before, according to the Albada type finder, when the photographing size is changed over to the second size by the change-over mechanism, the mask member enters the optical path between the half mirror and the eye piece in the vicinity of the half mirror in the Albada type finder, so that the reflected light which is reflected to the outside of the second size field frame on the eye piece can be absorbed into the mask member, therefore, the outside of the second size field frame can blocked out during the second size shot.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. An Albada type finder having an eye piece which is adapted for a camera having a half mirror and capable of photographing a first size and a second smaller size and formed with field frames for the first size and for the second size, wherein said Albada type finder comprises:

a movable mask member located between said half mirror and said eye piece at a location closer to said half mirror than said eyepiece, said mask member being movable into an optical path formed between said half mirror and said eye piece of said Albada type finder to form an opening equal to said field frame for the second size, said mask member masking and blackening an outside of said second size field frame from view and preventing reflection of the field frame for the first size by said half mirror; and a change-over mechanism for advancing said mask member into the optical path formed between said half mirror and said eye piece during the second size shot.

2. The Albada type finder of claim 1, wherein said first size is a full size.

3. The Albada type finder of claim 1, wherein said mask member includes a first rotatably pivotal mask plate which is provided between said half mirror and said eye piece from above the optical path and a second rotatably pivotal mask plate which is provided from below the optical path; and the opening equal to said field frame for the second size is formed between said first and second mask plates when said first and second mask plates advance into the optical path.

4. The Albada type finder of claim 1, wherein said mask member is formed of a member for adsorbing light.

5. The Albada type finder of claim 1, wherein said finder is interlocked with a member for changing an aspect ratio of a screen size to be changed over to said first size and said second size in synchronism with movement of said mask member by said change-over mechanism.

6. A camera having a half mirror and capable of photographing a first size and a second, smaller size and formed with field frames for the first size and the second size and an Albada type finder having an eye piece which is adapted for the camera and defining a visual field of view, wherein said Albada type finder comprises:

a movable mask member located between said half mirror and said eye piece at a location closer to said half mirror than said eyepiece, said mask member being movable into an optical path formed between said half mirror and said eye piece of said Albada type finder to form an opening equal to said field frame for the second size, said mask member masking and blackening substantially all portions of the visual field of view outside of said second size field frame and preventing reflection of the field frame for the first size by said half mirror; and a change-over mechanism for advancing said mask member into the optical path formed between said half mirror and said eye piece during a second size shot.

7. The camera of claim 6, wherein said first size is a full size.

8. The camera of claim 6, wherein said mask member includes first and second rotatable mask plates which are provided between said half mirror and said eye piece, said first mask plate being provided from above the optical path and said second rotatable mask plate being provided from below the optical path; and said opening is formed between the first mask plate and the second mask plate when the first mask plate and the second mask plate advance into the optical path.

9. The camera of claim 6, wherein said mask member is formed of a member for adsorbing light.

10. The camera of claim 6, wherein said finder is interlocked with a member for changing an aspect ratio of a screen size to be changed over to said first size and said second size in synchronism with movement of said mask member by said change-over mechanism.

11. The camera of claim 6, wherein said movable mask member cuts upper and lower sections of the visual field of view above and below said second field frame.

* * * * *